US012187568B2

(12) United States Patent
Shimada

(10) Patent No.: US 12,187,568 B2
(45) Date of Patent: Jan. 7, 2025

(54) DRIVE UNIT, SHEET CONVEYOR, AND IMAGE FORMING APPARATUS

(71) Applicant: Kazuhiro Shimada, Kanagawa (JP)

(72) Inventor: Kazuhiro Shimada, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 126 days.

(21) Appl. No.: 18/121,594

(22) Filed: Mar. 15, 2023

(65) Prior Publication Data

US 2023/0294938 A1 Sep. 21, 2023

(30) Foreign Application Priority Data

Mar. 15, 2022 (JP) ................................ 2022-040317

(51) Int. Cl.

| | |
|---|---|
| ***G03G 15/00*** | (2006.01) |
| ***B65H 3/06*** | (2006.01) |
| ***B65H 5/02*** | (2006.01) |
| ***B65H 5/06*** | (2006.01) |
| ***G03G 15/01*** | (2006.01) |
| ***G03G 15/16*** | (2006.01) |

(52) U.S. Cl.

CPC ........... *B65H 5/025* (2013.01); *B65H 3/0669* (2013.01); *G03G 15/0136* (2013.01); *G03G 15/1615* (2013.01); *B65H 2404/255* (2013.01); *B65H 2404/262* (2013.01); *B65H 2801/06* (2013.01)

(58) Field of Classification Search

CPC ........ B65H 2404/255; B65H 2404/262; B65H 2403/20; B65H 2403/25; B65H 3/0669; B65H 5/025; G03G 15/1615; G03G 15/0136

See application file for complete search history.

(56) References Cited

U.S. PATENT DOCUMENTS

| | | | | |
|---|---|---|---|---|
| 2011/0229243 | A1* | 9/2011 | Shiba ................. | G03G 15/0194 400/618 |
| 2017/0123373 | A1 | 5/2017 | Ogino et al. | |
| 2022/0317601 | A1 | 10/2022 | Aoki et al. | |
| 2023/0061068 | A1 | 3/2023 | Goto et al. | |

FOREIGN PATENT DOCUMENTS

| | | |
|---|---|---|
| JP | 8-014342 | 1/1996 |
| JP | 2002-028877 | 1/2002 |
| JP | 2019-158089 | 9/2019 |

OTHER PUBLICATIONS

U.S. Appl. No. 17/823,605, filed Aug. 31, 2022, Hiroshi Kikuchi, et al.

* cited by examiner

*Primary Examiner* — Luis A Gonzalez

(74) *Attorney, Agent, or Firm* — XSENSUS LLP

(57) ABSTRACT

A drive unit includes a drive source and a driving force transmitter that includes a plurality of rotators, an endless belt stretched by the plurality of rotators, a pressing member to press the endless belt, a first support shaft, a first link member to hold the pressing member, a second support shaft, a second link member to press the first link member, a biasing member to bias the second link member. A relation of L1 to L2 satisfies L1>L2, where L1 denotes a distance between the second support shaft and a biasing position and L2 denotes a distance between the second support shaft and a first pressing position. A relation of L3 to L4 satisfies L3>L4, where L3 denotes a distance between the first support shaft and the pressing position and L4 denotes a distance between the first support shaft and a second pressing position.

9 Claims, 5 Drawing Sheets

DRIVE UNIT, SHEET CONVEYOR, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-040317, filed on Mar. 15, 2022, in the Japan Patent Office, the entire disclosure of which is hereby incorporated by reference herein.

BACKGROUND

Technical Field

Embodiments of the present disclosure relate to a drive unit, a sheet conveyor, and an image forming apparatus.

Background Art

Various types of drive units included in image forming apparatuses, i.e., printers, facsimile machines and copies, are known to include an endless belt.

Such a drive unit includes a belt, a drive roller that drives and rotates the belt, a driven roller that stretches the belt cooperating with the drive roller, and a tension roller that applies tension to the belt. For example, a known drive unit has a configuration in which a tension roller is biased by a spring to apply tension to a belt.

SUMMARY

Embodiments of the present disclosure described herein provide a novel drive unit including a drive source and a driving force transmitter to transmit a driving force of the drive source to an object to be driven. The driving force transmitter includes a plurality of rotators, an endless belt, a pressing member, a first support shaft, a first link member, a second support shaft, a second link member, and a biasing member. The endless belt is stretched by the plurality of rotators. The pressing member presses the endless belt to apply tension to the endless belt. The first link member is rotatable around the first support shaft and holds the pressing member. The second link member is rotatable around the second support shaft and presses the first link member. The biasing member biases the second link member to press the belt by the pressing member. A relation of L1 to L2 satisfies L1>L2, where L1 denotes a distance between the second support shaft and a biasing position at which the biasing member biases the second link member and L2 denotes a distance between the second support shaft and a first pressing position at which the second link member presses the first link member. A relation of L3 to L4 satisfies L3>L4, where L3 denotes a distance between the first support shaft and the pressing position at which the second link member presses the first link member and L4 denotes a distance between the first support shaft and a second pressing position at which the pressing member presses the endless belt.

Further, embodiments of the present disclosure described herein provide a sheet conveyor including a conveyance member to convey a conveyance object, and the above-described drive unit to drive the conveyance member.

Further, embodiments of the present disclosure described herein provide an image forming apparatus including an image former to form an image on a recording medium and the above-described drive unit.

Further, embodiments of the present disclosure described herein provide an image forming apparatus including an image former to form an image on a recording medium and the above-described sheet conveyor.

BRIEF DESCRIPTION OF THE SEVERAL VIEWS OF THE DRAWINGS

Exemplary embodiments of this disclosure will be described in detail based on the following figures, wherein.

Figure 1:
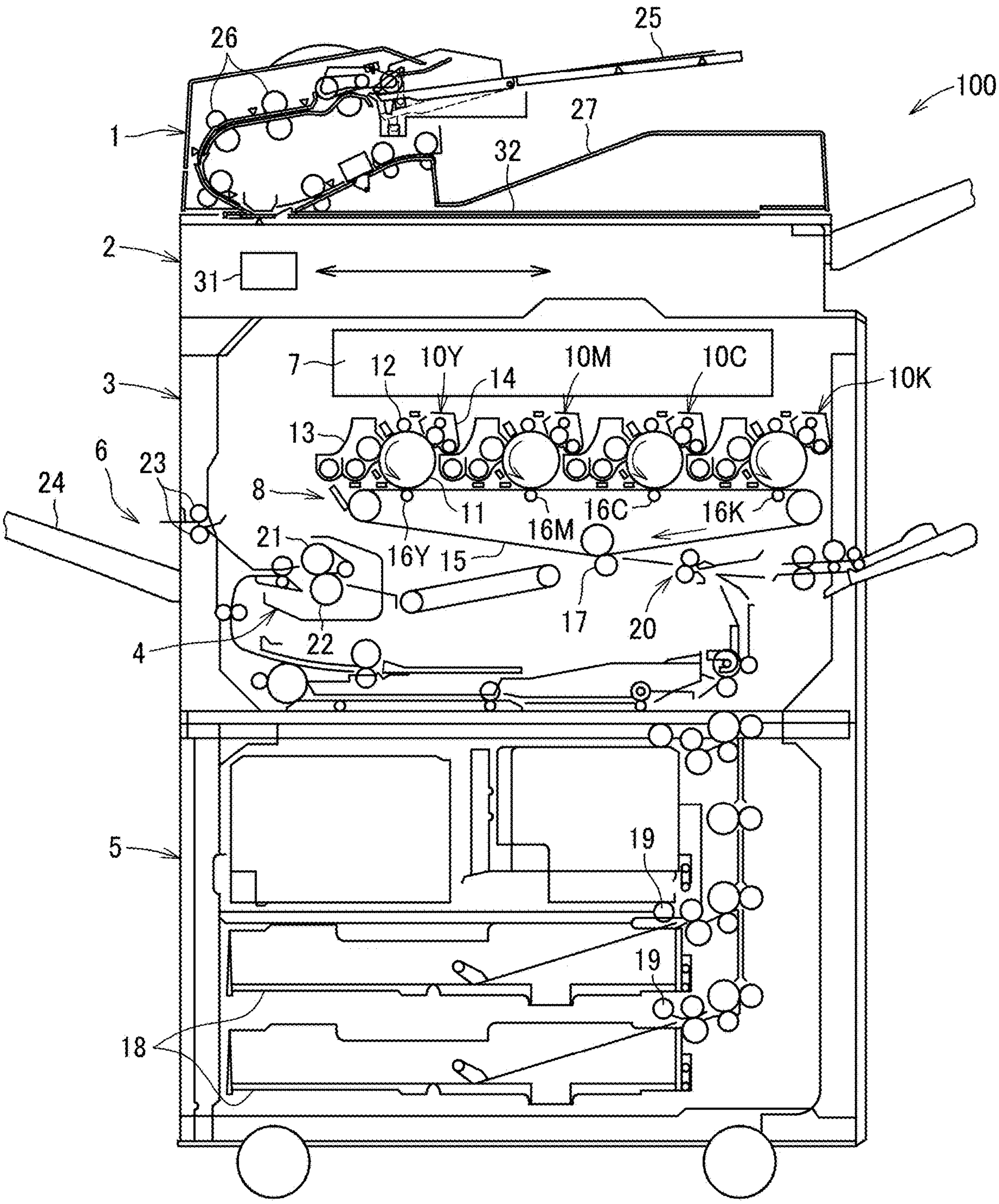
FIG. 1 is a diagram illustrating an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Descriptions are given of an example applicable to a drive unit, a sheet conveyor, and an image forming apparatus, with reference to the drawings. In the drawings for illustrating embodiments of the present disclosure, identical reference numerals are assigned to elements such as members and parts that have an identical function or an identical shape as long as differentiation is possible, and descriptions of such elements may be omitted once the description is provided.

FIG. 1 is a diagram illustrating an image forming apparatus according to an embodiment of the present disclosure.

Specifically, the image forming apparatus in the present embodiment is applicable to any of copier, facsimile machine, printer, printing machine, and a multi-functional apparatus including at least two functions of the copier, facsimile machine, printer, and printing machine. However, the image forming method performed in the image forming apparatus is not limited to the electrophotographic method and may be an inkjet method. Further, the term "image formation" in this specification indicates an action for providing (i.e., printing) not only an image having meanings such as texts and figures on a recording medium but also an image having no meaning such as patterns on a recording medium.

Referring now to FIG. 1, a description is given of the overall configuration and operations of an image forming apparatus according to the present embodiment.

As illustrated in FIG. 1, an image forming apparatus 100 according to the present embodiment includes an original document conveying device 1, an image reading device 2, an image forming device 3, a fixing device 4, a recording medium feeding device 5, and a recording medium ejection device 6. The original document conveying device 1 conveys an original document. The image reading device 2 reads an image on the original document. The image forming device 3 serving as an image former forms an image on a recording medium. The recording medium feeding device 5 feeds the recording medium. The recording medium ejection device 6 ejects the recording medium.

The original document conveying device 1 includes an original document feed tray 25 on which the original document is placed, a plurality of conveyance rollers 26 that convey the original document from the original document feed tray 25 toward an exposure glass 32 of the image reading device 2, and an original document ejection tray 27 to which the original document is ejected.

The image reading device 2 includes the exposure glass 32 and an optical scanning unit 31 that optically reads an image on the original document placed on the exposure glass 32. The optical scanning unit 31 includes a light source that irradiates the original document with light, and a charge-coupled device (CCD) that reads an image from the reflected light of the original document. As an alternative to the CCD, another image sensor such as a close contact-type image sensor (CIS) may be employed as an image reader. The optical scanning unit 31 moves in a direction indicated by the arrow in FIG. 1 (i.e., the sub-scanning direction) by a carrier as a drive unit, so as to form an imaging element via a lens to form an image on the original document. Further, the image reading device 2 may not be included in the image forming apparatus 100 but may be disposed away from the image forming apparatus 100 and be connected to the image forming apparatus 100 via wire or wireless.

The image forming device 3 includes four image forming units 10Y, 10M, 10C, and 10K, an image writing device 7, and a transfer device 8. Each of the image forming units 10Y, 10M, 10C, and 10K includes a photoconductor 11. The image writing device 7 writes an electrostatic latent image on the photoconductor 11 of each of the image forming units 10Y, 10M, 10C, and 10K. The transfer device 8 transfers an image onto a recording medium.

The image forming units 10Y, 10M, 10C, and 10K have a configuration similar to each other, except for containing different color toners (developers), i.e., yellow (Y), magenta (M), cyan (C), and black (K) toners, respectively, corresponding to decomposed color separation components of full-color images. To be more specific, each of the image forming units 10Y, 10M, 10C, and 10K includes the photoconductor 11 serving as an image bearer bearing the image on the surface of the photoconductor 11, a charger 12 to charge the surface of the photoconductor 11, a developing device 13 to supply the toner as the developer to the surface of the photoconductor 11 to form a toner image, and a cleaning device 14 to clean the surface of the photoconductor 11.

The image writing device 7 includes a laser diode (LD) that irradiates the surface of the photoconductor 11 with light (laser beam). The image writing device 7 modulates a drive signal of the LD in accordance with image data and writes an electrostatic latent image on the photoconductor 11 with light emitted from the LD.

The transfer device 8 includes an intermediate transfer belt 15, primary transfer rollers 16Y, 16M, 16C, and 16K, and a secondary transfer roller 17. The intermediate transfer belt 15 is an endless belt wound with tension by a plurality of rollers. The primary transfer rollers 16Y, 16M, 16C, and 16K are disposed inside the endless loop of the intermediate transfer belt 15. As each of the primary transfer rollers 16Y, 16M, 16C, and 16K contacts the photoconductor 11 of each of the image forming units 10Y, 10M, 10C, and 10K via the intermediate transfer belt 15, a primary transfer portion (i.e., a primary transfer nip region) is formed between the intermediate transfer belt 15 and each photoconductor 11 of the image forming units 10Y, 10M, 10C, and 10K. The secondary transfer roller 17 contacts the outer circumferential face of the intermediate transfer belt 15, forming a secondary transfer portion (i.e., a secondary transfer nip region) between the secondary transfer roller 17 and the intermediate transfer belt 15.

The fixing device 4 includes a fixing rotator 21 and a pressure rotator 22. The fixing rotator 21 is heated by a heating source such as a heater. The pressure rotator 22 is pressed against the fixing rotator 21, forming a fixing nip region between the fixing rotator 21 and the pressure rotator 22.

The recording medium feeding device 5 includes a sheet tray 18 and a sheet feed roller 19. The sheet tray 18 accommodates a sheet (or sheets) as a recording medium (or recording media). The sheet feed roller 19 feeds the sheet from the sheet tray 18. A "recording medium" is described as a "sheet of paper" (referred to as "sheet") in the following embodiments. However, the "recording medium" is not limited to the sheet of paper. For example, the "recording medium" includes not only the sheet of paper but also an overhead projector (OHP) transparency sheet, a fabric, a metallic sheet, a plastic film, and a prepreg sheet including carbon fibers previously impregnated with resin. In addition, the term "sheet" is not limited to a sheet such as plain paper but also is applicable to thick paper, post cards, envelopes, thin paper, coated paper, art paper, and tracing paper.

The recording medium ejection device 6 includes a pair of ejection rollers 23 and an ejection tray 24. The pair of ejection rollers 23 ejects the sheet. The ejection tray 24 holds the sheet ejected by the pair of ejection rollers 23.

A description is now given of the printing operation performed by the image forming apparatus 100 according to the present embodiment, with reference to FIG. 1.

When the image forming apparatus receives an instruction for image formation, the image reading device 2 reads the image on an original document.

The original document is fed from the original document feed tray 25 to be conveyed to the exposure glass 32 or placed on the exposure glass 32. The image on the original document passing over the exposure glass 32 or the image on the original document placed on the exposure glass 32 is read by the optical scanning unit 31 of the image reading device 2. Then, the image data read from the image on either original document is sent to the image forming device 3.

In the image forming device 3, the photoconductor 11 of each of the image forming units 10Y, 10M, 10C, and 10K starts rotating and the charger 12 uniformly charges the surface of each photoconductor 11 of each of the image forming units 10Y, 10M, 10C, and 10K to a relatively high electric potential. Then, the image writing device 7 emits light to the (charged) surface of the photoconductor 11 of each of the image forming units 10Y, 10M, 10C, and 10K, based on the image data of the original document read by the image reading device 2. As a result, the electric potential on the portion irradiated with light decreases to form an electrostatic latent image on the surface of the photoconductor 11 of each of the image forming units 10Y, 10M, 10C, and 10K. The developing device 13 supplies toner to the electrostatic latent image formed on the photoconductor 11 of each of the image forming units 10Y, 10M, 10C, and 10K, forming the toner image the photoconductor 11 of each of the image forming units 10Y, 10M, 10C, and 10K.

When the toner image formed on the photoconductor 1l of each of the image forming units 10Y, 10M, 10C, and 10K reaches the primary transfer nip reason formed at each of the respective primary transfer rollers 16Y. 16M. 16C, and 16K, along with the rotation of the photoconductor 11 of each of the image forming units 10Y, 10M, 10C, and 10K, the toner images of the image forming units 10Y, 10M, 10C, and 10K are sequentially transferred onto the intermediate transfer belt 15 that is rotating. Thus, a full color toner image is formed on the intermediate transfer belt 15. The image forming apparatus 100 can form a monochrome toner image by using any one of the four image forming units 10Y, 10M, 10C, and 10K or can form a two-color toner image or a three-color toner image by using two or three of the image forming units 10Y, 10M. 10C, and 10K. After the toner image is transferred from the photoconductor 11 of each of the image forming units 10Y, 10M, 10C, and 10K onto the intermediate transfer belt 15, the cleaning device 14 removes the residual toner remaining on the photoconductor 11 from the surface of the photoconductor 11 of each of the image forming units 10Y, 10M, 10C, and 10K.

After being transferred onto the intermediate transfer belt 15, the toner images are conveyed to the secondary transfer portion at the position of the secondary transfer roller 17 along with rotation of the intermediate transfer belt 15 and transferred onto the sheet at the secondary transfer portion. The sheet is fed from the sheet tray 18. As the sheet feed roller 19 rotates, the sheet is fed from the sheet tray 18. After the timing roller pair 20 temporarily stops the sheet supplied from the sheet tray 18, the sheet is conveyed by the timing roller pair 20 in synchrony with the timing at which the toner image on the intermediate transfer belt 15 reaches the secondary transfer portion.

The sheet is then conveyed to the fixing device 4 where the fixing rotator 21 and the pressure rotator 22 apply heat and pressure to the toner image on the sheet, so that the toner image is fixed to the sheet. Then, the sheet is ejected by the ejection rollers 23 to the outside of the image forming apparatus 100 and is placed on the ejection tray 24. Due to these operations, a series of image forming operations is completed.

Figure 2:
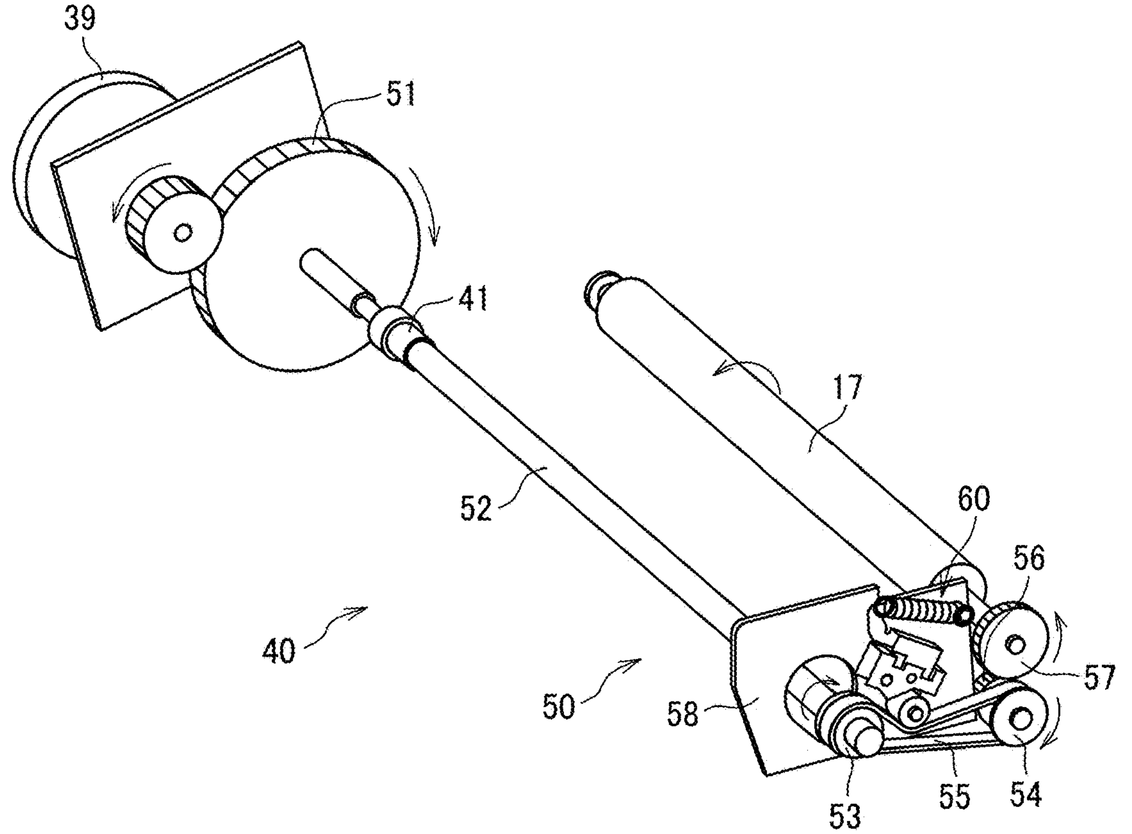
FIG. 2 is a diagram illustrating a configuration of a drive unit according to an embodiment of the present disclosure.

FIG. 2 is a diagram illustrating a configuration of a drive unit 40 that drives the secondary transfer roller 17, according to an embodiment of the present disclosure.

As illustrated in FIG. 2, the drive unit 40 according to the present embodiment includes an electric motor 39 and a driving force transmission mechanism 50. The electric motor 39 serves as a drive source. The driving force transmission mechanism 50 transmits the driving force of the electric motor 39 to the secondary transfer roller 17 serving as a driven object.

The driving force transmission mechanism 50 includes an input gear 51, an input shaft 52, a drive pulley 53, a driven pulley 54, an endless belt 55, an output gear 56, a secondary transfer roller gear 57, and a tension application mechanism 60. The input gear 51 is a gear to which the driving force of the electric motor 39 is input. The input shaft 52 is coupled to the input gear 51. The drive pulley 53 serves as a drive rotator mounted on the input shaft 52. The driven pulley 54 serves as a driven rotator. The belt is an endless belt wound with tension by the drive pulley 53 and the driven pulley 54. The output gear 56 is mounted on the rotary shaft of the driven pulley 54. The secondary transfer roller gear 57 is meshed with the output gear 56. The tension application mechanism 60 applies tension to the endless belt 55.

As illustrated in FIG. 2, a coupling mechanism 41 is provided at one end of the input shaft 52, and the input shaft 52 is coupled to the rotary shaft of the input gear 51 via the coupling mechanism 41.

The drive pulley 53 is mounted on the other end of the input shaft 52. The other end of the input shaft 52 is proximate to the coupling mechanism 41.

In the drive unit 40 according to the present embodiment, when the electric motor 39 starts to rotate and the driving force of the electric motor 39 is input to the input gear 51, the input gear 51 is rotated, and the input shaft 52 and the drive pulley 53 are rotated along with the rotation of the input gear 51. Due to this configuration, the endless belt 55 and the driven pulley 54 are rotated along with rotation of the drive pulley 53, and the output gear 56 and the secondary transfer roller gear 57 meshed with the output gear 56 are rotated. As a result, the secondary transfer roller 17 having the secondary transfer roller gear 57 at one end rotates. As described above, the driving force is transmitted from the electric motor 39 to the secondary transfer roller 17.

Figure 3:
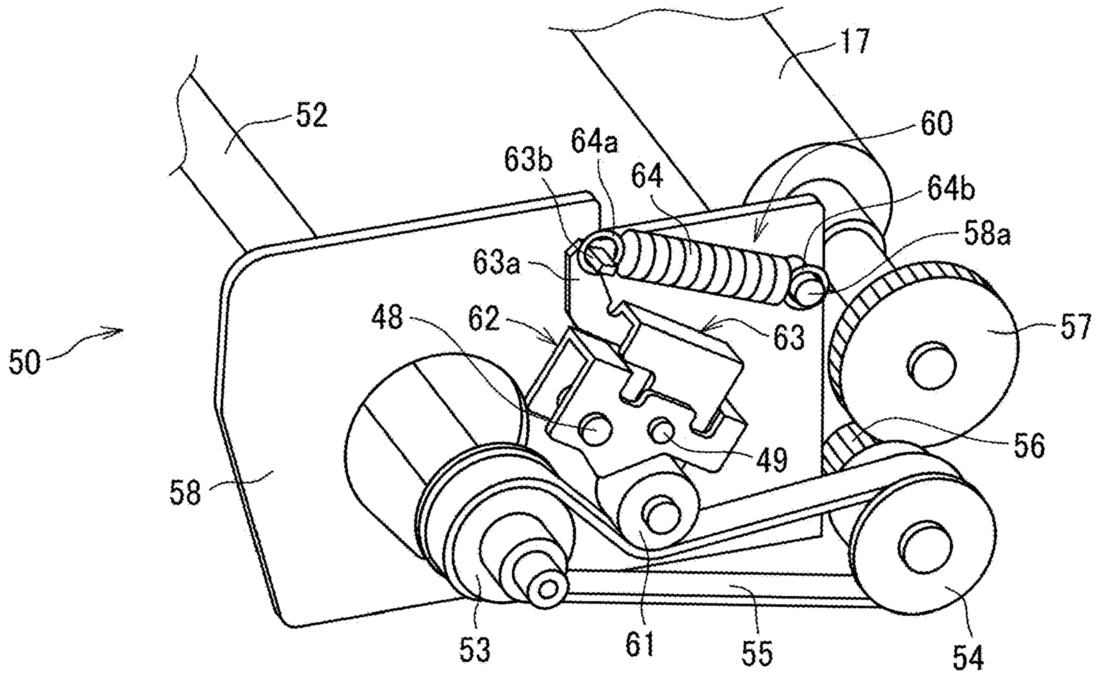
FIG. 3 is a perspective view of a configuration of a tension application mechanism according to an embodiment of the present disclosure.
Figure 4:
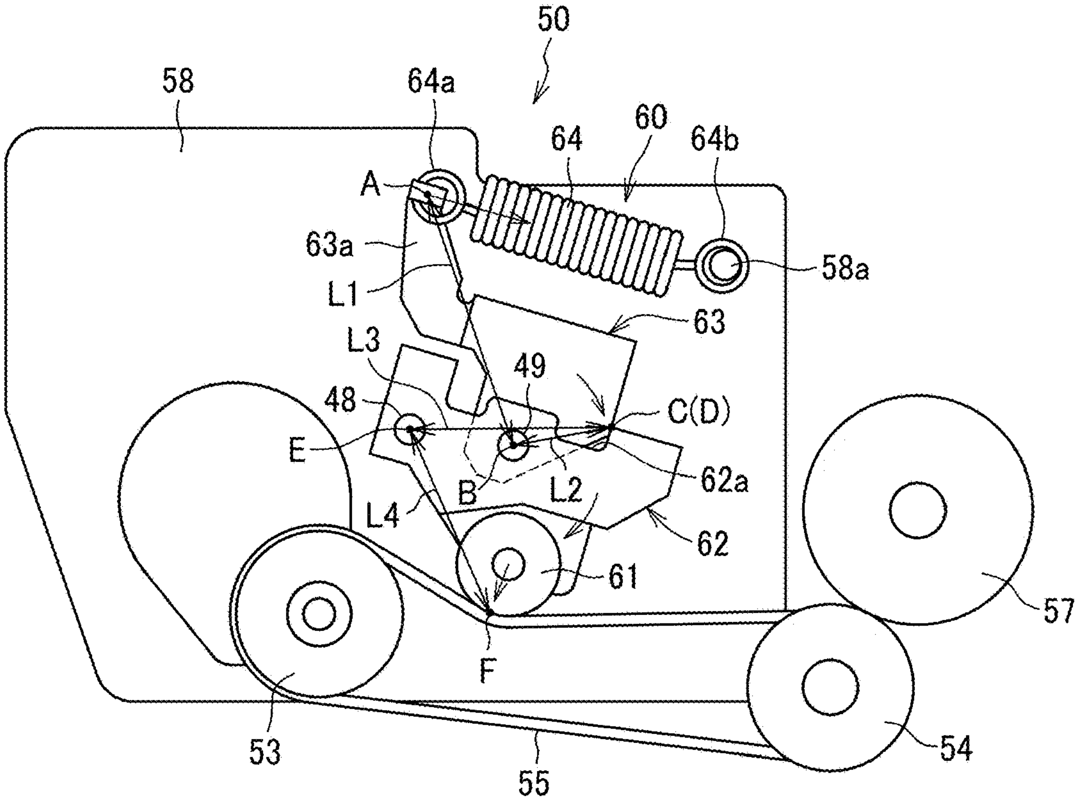
FIG. 4 is a side view of the configuration of the tension application mechanism according to an embodiment of the present disclosure.
Figure 5:
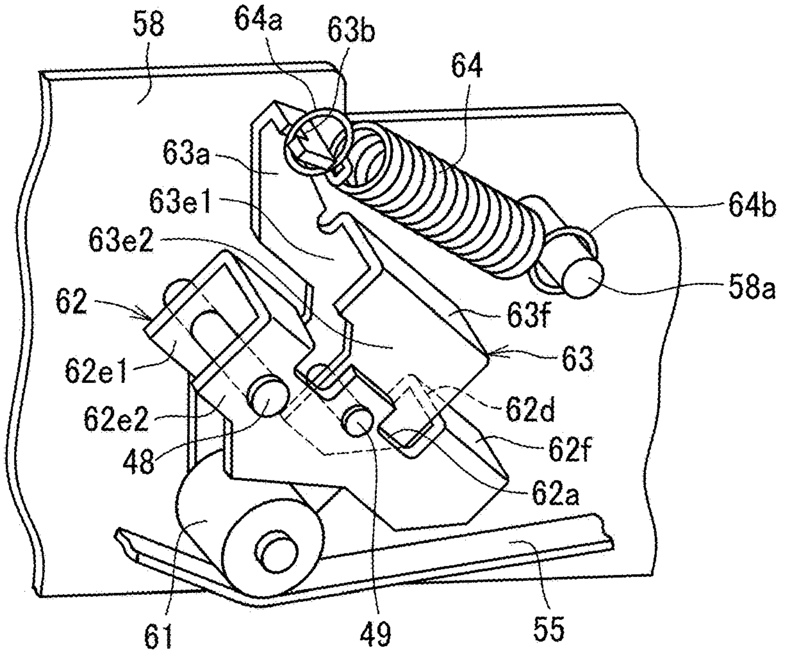
FIG. 5 is a perspective view of a configuration of connection of a first link member and a second link member, according to an embodiment of the present disclosure.

Descriptions are now given of the configuration of the tension application mechanism 60, with reference to FIGS. 3, 4, and 5.

FIG. 3 is a perspective view of a configuration of the tension application mechanism 60 according to an embodiment of the present disclosure.

FIG. 4 is a side view of the configuration of the tension application mechanism 60 according to an embodiment of the present disclosure.

FIG. 5 is a perspective view of a configuration of connection of a first link member and a second link member, according to an embodiment of the present disclosure.

As illustrated in FIGS. 3 and 4, the tension application mechanism 60 includes a tension roller 61, a first link member 62, a second link member 63, and a spring 64. The tension roller 61 serves as a pressing member that presses the endless belt 55. The first link member 62 holds the tension roller 61. The second link member 63 moves the first link member 62. The spring 64 serves as a biasing member that biases the second link member 63.

The tension roller 61 presses the outer circumferential face of the endless belt 55 between the drive pulley 53 and the driven pulley 54. The tension roller 61 is rotatably held by the first link member 62. The first link member 62 is supported by a first support shaft 48 that is mounted on a side panel 58 serving as a support and is rotatable around the first support shaft 48.

The second link member 63 is supported by a second support shaft 49 that is mounted on the first link member 62 and is rotatable around the second support shaft 49. The second link member 63 includes an arm-shaped extending portion 63*a*. An engaging portion 63*b* (see FIG. 5) having a recessed shape is mounted on the tip end of the arm-shaped extending portion 63*a*. One end 64*a* of the spring 64 is engaged with the engaging portion 63*b*. The other end 64*b* of the spring 64 is engaged with a pin-shaped engaging portion 58*a* projecting from the side panel 58. As a result, the tensile force of the spring 64 is applied to the second link member 63.

As illustrated in FIG. 5, the first link member 62 according to the present embodiment has a U shape in cross section and includes a bend 62*f* and counter pieces 62*e*1 and 62*e*2. The counter pieces 62*e*1 and 62*e*2 are opposed pieces disposed facing to each other and are bent via the bend 62*f*. Similarly, the second link member 63 according to the present embodiment has a U shape in the cross section and includes a bend 63*f* and counter pieces 63*e*1 and 63*e*2. The counter pieces 63*e*1 and 63*e*2 are opposed pieces disposed facing each other and are bent via the bend 63*f* The tension roller 61 is rotatably attached to the counter piece 62*e*1 of the pair of counter pieces 62*e*1 and 62*e*2 disposed facing each other as opposed pieces of the first link member 62. The counter piece 62*e*1 is disposed proximate to the side panel 58. On the other hand, the arm-shaped extending portion 63*a* with which the spring 64 is engaged is provided on the counter piece 63*e*1 of the pair of counter pieces 63*e*1 and 63*e*2 disposed facing each other as opposed pieces of the second link member 63. The counter piece 63*e*1 is disposed proximate to the side panel 58.

As illustrated in FIG. 5, the bend 62*f* of the first link member 62 has an opening 62*a* through which the second link member 63 is inserted into the first link member 62. In a state where the second link member 63 is inserted in the first link member 62, the second support shaft 49 is inserted through a portion w % here the counter pieces 62*e*1 and 62*e*2 of the first link member 62 and the counter pieces 63*e*1 and 63*e*2 of the second link member 63 overlap each other, so as to be fixed to each of the counter pieces 62*e*1 and 62*e*2 of the first link member 62. As a result, the first link member 62 and the second link member 63 are relatively and rotatably coupled to each other via the second support shaft 49. The second support shaft 49 may be fixed to each of the counter pieces 63*e*1 and 63*e*2 of the second link member 63 and be rotatably inserted into an opening formed in each of the counter pieces 62*e*1 and 62*e*2 of the first link member 62. The first support shaft 48 is inserted through the pair of counter pieces 62*e*1 and 62*e*2 of the first link member 62 and is fixed to the side panel 58. Due to such a configuration, the first link member 62 is rotatably attached to the side panel 58. The first support shaft 48 may be fixed to each of the counter pieces 62*e*1 and 62*e*2 of the first link member 62 and be rotatably inserted into an opening formed in the side panel 58.

In the tension application mechanism 60 having the above-described configuration, as the second link member 63 is pulled by the spring 64 in a direction indicated by the arrow in FIG. 4, the second link member 63 receives the biasing force of the spring 64 and rotates in the clockwise direction in FIG. 4 around the second support shaft 49. At this time, when the second link member 63 rotates, the second link member 63 contacts a rim 62*d* (see FIG. 5) of the opening 62*a* of the first link member 62 to press the rim 62*d* of the opening 62*a*. As a result, the first link member 62 rotates in the clockwise direction in FIG. 4 around the first support shaft 48, and the tension roller 61 that is held by the first link member 62 presses the outer circumferential face of the endless belt 55.

As illustrated in FIG. 4, a distance between a point of effort A that is a biasing position at which the spring 64 biases the second link member 63 and a fulcrum B of the second support shaft 49 is denoted as a distance L1 and a distance between a point of load C that is a pressing position at which the second link member 63 presses the first link member 62 and the fulcrum B of the second support shaft 49 is denoted as a distance L2. The respective positions of the point of effort A, the fulcrum B, and the point of load C are defined to satisfy the relation of L1>L2. Further, a distance between a point of effort D that is a pressing position at which the second link member 63 presses the first link member 62 and a fulcrum E of the first support shaft 48 is denoted as a distance L3 and a distance between a point of load F that is a pressing position at which the tension roller 61 presses the endless belt 55 and the fulcrum E of the first support shaft 48 is denoted as a distance L4. The respective positions of the point of effort D, the fulcrum E, and the point of load F are defined to satisfy the relation of L3>L4.

As described above, in the present embodiment, since the positions of each of the points of effort, the fulcrums, and the points of load are set so that the relation of L1>L2 and the relation of L3>L4 are satisfied, the biasing force of the spring 64 is increased due to the principle of leverage and is transmitted to the tension roller 61. As a result, the tension roller 61 presses the surface of the endless belt 55 with an increased force, so that the tensile force is applied to the endless belt 55.

In the present embodiment, two link members, which are the first link member 62 and the second link member 63, are used to transmit the biasing force of the spring 64 to the tension roller 61. Such a configuration in which the biasing force of the spring 64 is transmitted to the tension roller 61 via the first link member 62 and the second link member 63 has the following advantages over the configuration in which the biasing force of a spring 72 is transmitted using a single link member 71 that rotates around a single fulcrum G as illustrated in FIG. 8.

Figure 8:
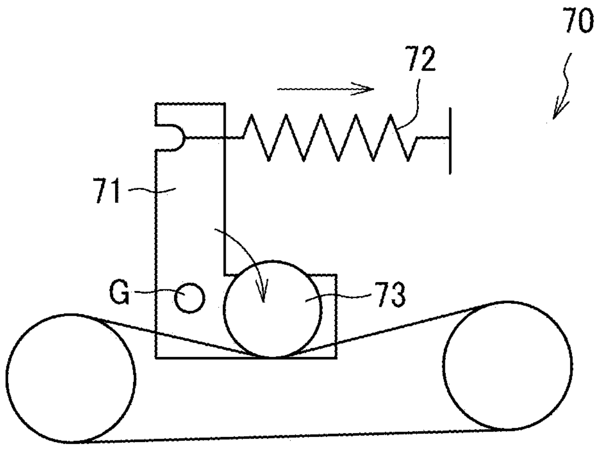
FIG. 8 RELATED ART
FIG. 8 is a diagram illustrating a configuration of a known drive unit.

FIG. 8 is a diagram illustrating the configuration of a known drive unit 70.

As the first advantage of the configuration according to an embodiment of the present disclosure, the biasing force of the spring 64 is transmitted via the first link member 62 and the second link member 63 having different fulcrums. For this reason, the configuration according to an embodiment of the present disclosure has an advantage in which the pressing force of the tension roller can be effectively increased, over the configuration in which the biasing force of the spring 72 is transmitted to the tension roller 73 via the single link member 71 in the known drive unit 70 including the configuration as illustrated in FIG. 8. In other words, since the force is increased with the second-step principle of leverage in the configuration according to the embodiment of the present disclosure, a relatively large pressing force is obtained.

As the second advantage, the configuration according to an embodiment of the present disclosure enhances the degrees of freedom in design change when compared with the configuration illustrated in FIG. 8. The pressing force of the tension roller is affected not only by the magnitude of the biasing force of the spring but also by the relative positions of the point of effort, the fulcrum, and the point of load and the relative distances between the point of effort, the fulcrum, and the point of load. For this reason, changing the relative positions and relative distances can increase the pressing force of the tension roller. However, since the known drive unit 70 including the configuration illustrated in FIG. 8 has a single link member 71, the point of effort, the fulcrum, and the point of load have less variation in selectable positions and are susceptible to restriction on the layout of components. On the other hand, since the configuration according to an embodiment of the present disclosure employs two link members, more specifically, the first link member 62 and the second link member 63, this configuration has two points of effort, two fulcrums, and two points of load. Due to such a configuration, the configuration according to an embodiment of the present disclosure has various selectable positions. As a result, the configuration according to the embodiment of the present disclosure is less susceptible to restriction on the layout of components than the configuration of the known unit illustrated in FIG. 8 and is easy to change the design to increase the pressing force of the tension roller.

As described above, the configuration according to an embodiment of the present disclosure includes a plurality of link members. Due to this configuration, when compared with the configuration of the known drive unit 70 as illustrated in FIG. 8, the pressing force of the tension roller is increased with a relatively small increase in the biasing force of the spring, and the tensile force of the belt can be increased. As a result, a relatively small biasing force of a spring in the configuration according to an embodiment of the present disclosure can prevent the positional deviation in the rotational direction, for example, slipping or tooth jumping, between the belt and the roller. Further, the configuration according to an embodiment of the present disclosure can prevent the deterioration in the parts assembly performance caused by an increase in the biasing force of the spring.

Furthermore, the configuration according to an embodiment of the present disclosure employs a plurality of link members and is less susceptible to restriction on the layout of components than the configuration illustrated in FIG. 8. For this reason, this configuration can easily change the design to increase the pressing force of the tension roller. In other words, the configuration according to an embodiment of the present disclosure can achieve a variety of selections of the layout of components and increase the pressing force of the tension roller due to the change of the parts layout. Since the pressing force of the tension roller can be increased without depending on an increase in the pressing force of the spring, the configuration according to an embodiment of the present disclosure can increase the pressing force of the tension roller while increasing the biasing force of the spring. As a result, the configuration according to an embodiment of the present disclosure can achieve both prevention of the positional deviation in the rotational direction between the belt and the roller and prevention of the deterioration in the parts assembly performance.

Furthermore, when the second link member 63 is inserted into the first link member 62 as the configuration illustrated in FIGS. 2 to 5, the installation space of the first link member 62 and the second link member 63 can be reduced and can achieve a decrease in the size of the apparatus. In this case, since the restriction of the layout of components is further reduced, it is easy to arrange the components in a limited space.

A description below is given of a configuration of the tension application mechanism according to an alternative embodiment of the present disclosure.

The following description is given of the configuration of the tension application mechanism according to another embodiment, different from the configuration of the tension application mechanism according to the above-described embodiment. The description of the configuration of the tension application mechanism according to the alternative embodiment that is basically the same as the configuration of the tension application mechanism according to the above-described embodiment may be omitted.

Figure 6:
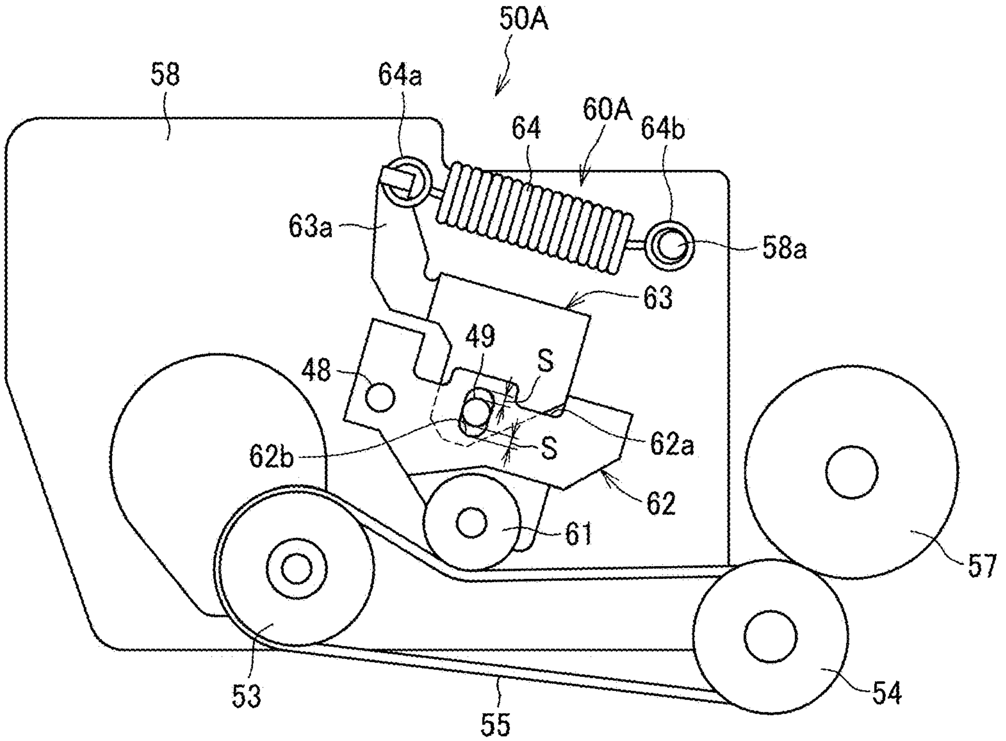
FIG. 6 is a diagram illustrating a configuration of the tension application mechanism according to a second embodiment of the present disclosure.

FIG. 6 is a diagram illustrating a configuration of a tension application mechanism 60A according to a second embodiment of the present disclosure.

In the tension application mechanism 60A included in a driving force transmission mechanism 50A according to the second embodiment of the present disclosure as illustrated in FIG. 6, the second support shaft 49 as the rotation fulcrum of the second link member 63 is mounted on the side panel 58. In other words, the second support shaft 49 is inserted through the portion where the counter pieces 62*e*1 and 62*e*2 of the first link member 62 and the counter pieces 63*e*1 and 63*e*2 of the second link member 63 overlap each other (see FIG. 5), so as to be fixed to the side panel 58. In this case, unlike the above-described embodiment, since the second support shaft 49 does not rotate together with the first link member 62, the rotary motion of the first link member 62 around the first support shaft 48 is prevented from restriction by the second support shaft 49. As a result, in the present embodiment, a clearance S is arranged between the second support shaft 49 and a shaft insertion hole 62*b* of the first link member 62 through which the second support shaft 49 is inserted, at least in the rotational direction around at least the first support shaft 48. Since it is sufficient that the second link member 63 rotates around the second support shaft 49, the diameter of the shaft insertion hole of the second link member 63 through which the second support shaft 49 is inserted is formed to be the same size as the diameter of the second support shaft 49.

As described above, even when the second support shaft 49 is fixed to the side panel 58, the first link member 62 rotates around the first support shaft 48 and the second link member 63 rotates around the second support shaft 49 in the same manner as in the above-described embodiment. Due to this configuration, the biasing force of the spring 64 is increased due to the principle of leverage via the first link member 62 and the second link member 63 and can be applied to the tension roller 61. As a result, like the driving force transmission mechanism 50 according to the above-described embodiment, the driving force transmission mechanism 50A according to the second embodiment can obtain the relatively large tensile force of a belt due to the relatively small biasing force of a spring and achieve both prevention of the positional deviation in the rotational direction between the belt and the roller and prevention of the deterioration in the component assembly performance.

Figure 7:
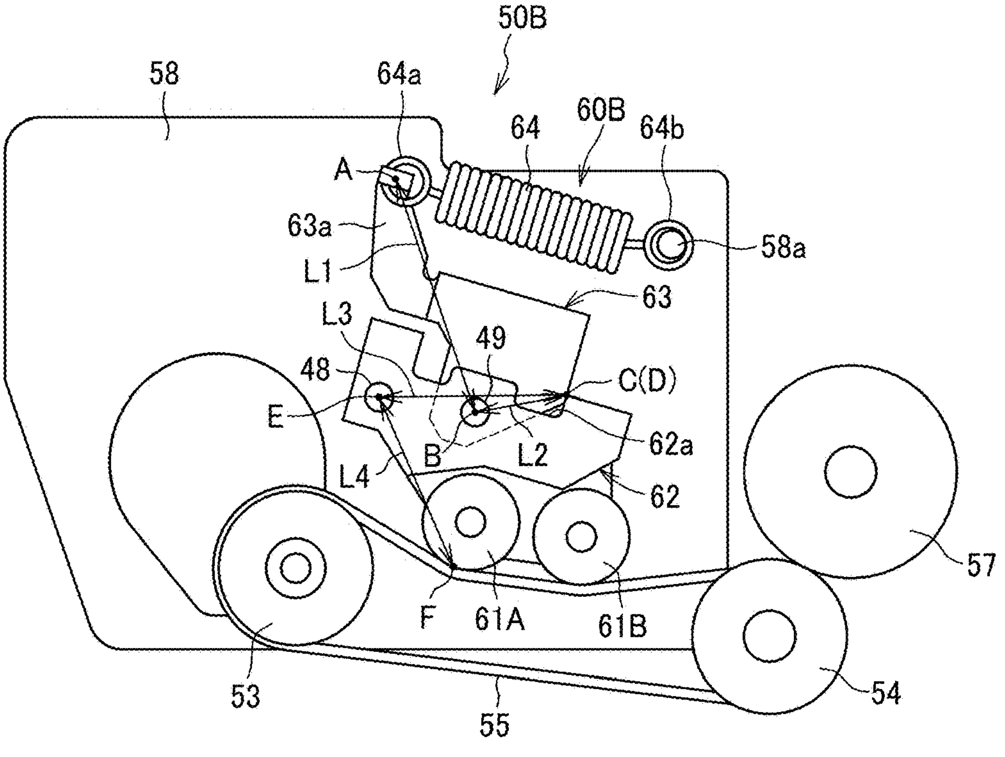
FIG. 7 is a diagram illustrating a configuration of the tension application mechanism according to a third embodiment of the present disclosure.

FIG. 7 is a diagram illustrating a configuration of a tension application mechanism 60B according to a third embodiment of the present disclosure.

In the tension application mechanism 60B included in a driving force transmission mechanism 50B according to the third embodiment of the present disclosure as illustrated in FIG. 7, the tension application mechanism 60B includes two tension rollers 61A and 61B. The tension rollers 61A and 61B are mounted on the first link member 62 and are rotated along with the rotary motion (swing motion) of the first link member 62 that rotates around the first support shaft 48. Due to such a configuration, when the second link member 63 presses the first link member 62 due to the biasing force of the spring 64, the first link member 62 rotates around the first support shaft 48 and the two tension rollers 61A and 61B press the outer circumferential face of the endless belt 55 at respective positions different from each other.

In the present embodiment, the biasing force of the spring 64 is increased via the first link member 62 and the second link member 63 to be applied to the tension rollers 61A and 61B. For this reason, the driving force transmission mechanism 50B according to the third embodiment can obtain the relatively large tensile force of a belt due to the relatively small biasing force of a spring. As a result, like the driving force transmission mechanism 50 according to the first embodiment and the driving force transmission mechanism 50A according to the second embodiment, the driving force transmission mechanism 50B according to the third embodiment can achieve both prevention of the positional deviation in the rotational direction between the belt and the roller and prevention of the deterioration in the component assembly performance.

In the present embodiment, since the two tension rollers 61A and 61B press the endless belt 55, two pressing positions as the respective points of load of the two tension rollers 61A and 61B are located on the endless belt 55. For this reason, in the present embodiment, the distance L4 that is set to satisfy the relation of L3>L4 (i.e., the distance between the point of load F as the pressing position of the endless belt 55 and the fulcrum E of the first support shaft 48) is difference between the tension roller 61A and the tension roller 61B. However, in order to obtain the effect of increasing the tensile force due to the principle of leverage, the relation of L3>L4 is to be satisfied in the relation of at least one of the tension roller 61A or the tension roller 61B. Since the distance between the pressing position the fulcrum E of the first support shaft 48 and the pressing position (i.e., the point of load F) of the tension roller 61A is shorter than the distance between the pressing position the fulcrum E of the first support shaft 48 and the pressing position (i.e., the point of load F) of the tension roller 61B in the present embodiment, the distance between the first support shaft 48 and the tension roller 61A that is shorter of the distances of the tension rollers 61A and 61B from the first support shaft 48 is defined as the distance L4. In other words, in the present embodiment, the distance between the point of load F as the pressing position of the tension roller 61A on the left side of FIG. 7 and the fulcrum E of the first support shaft 48 is defined as the distance L4. The positions of the point of effort D, the fulcrum E, and the point of load F are defined so that the distance L4 is shorter than the distance L3 between the point of effort D as the pressing position of the second link member 63 and the fulcrum E of the first support shaft 48.

The number of tension rollers may be three or more. Like the above-described embodiments, in the case where a plurality of tension rollers (e.g., three or more tension rollers) are disposed, the shortest distance of the distances between the first support shaft and each of the pressing positions of the three or more tension rollers, is defined as the distance L4, and the positions of the point of effort A, the fulcrum B. and the point of load C are defined so that the relation of L3>L4 is satisfied.

As described above, in each embodiment of the present disclosure, the drive unit that drives and rotates a secondary transfer roller. However, the present disclosure is not limited to the above-described drive unit that drives and rotates a secondary transfer roller and may be applicable to the sheet feed roller 19, the timing roller pair 20, and the ejection rollers 23, each conveying a sheet as a conveyance object, the conveyance rollers 26 that convey the original document, a carrier that moves the optical scanning unit 31, a drive unit or a sheet conveyor each driving and rotating a driven object or a conveyance object such as the fixing rotator 21 or the pressure rotator 22.

Specifically, with reference to FIG. 1, the sheet conveyor may be the original document conveying device 1 including the conveyance rollers 26, the image reading device 2 including the carrier of the optical scanning unit 31, the image forming device 3 including the timing roller pair 20, the ejection rollers 23, the fixing rotator 21, and the pressure rotator 22, and the recording medium feeding device 5 including the sheet feed roller 19. The drive unit 40 including the sheet feed roller 19, the timing roller pair 20, the ejection rollers 23, the conveyance rollers 26, the carrier of the optical scanning unit 31, the fixing rotator 21, or the pressure rotator 22 may have the same configuration as the configuration of the drive unit 40 including the secondary transfer roller 17.

In addition to the drive unit or the sheet conveyor each included in the image forming apparatus, the present disclosure is also applicable to a drive unit that drives a belt conveyor (e.g., a drive roller) conveying an object on the belt or a drive unit that drives a drive rotator (e.g., wheels) of a transport device such as a bicycle or an automobile device and the conveying device mounted on the image forming apparatus, the present invention is also applicable to a driving device that drives a belt conveyor (such as a driving roller) on which a cargo is placed and conveyed, and a driving device that drives a driving rotating body (such as a wheel) of a transport device such as a bicycle and a motor vehicle.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. A drive unit comprising:

a drive source; and a driving force transmitter configured to transmit a driving force of the drive source to an object to be driven;

the driving force transmitter including:

a plurality of rotators;

an endless belt stretched by the plurality of rotators;

a pressing member configured to press the endless belt to apply tension to the endless belt;

a first support shaft;

a first link member rotatable around the first support shaft and holding the pressing member;

a second support shaft;

a second link member rotatable around the second support shaft and pressing the first link member; and a biasing member configured to bias the second link member to press the endless belt by the pressing member, a relation of L1 to L2 satisfying L1>L2, where L1 denotes a distance between the second support shaft and a biasing position at which the biasing member biases the second link member, and L2 denotes a distance between the second support shaft and a first pressing position at which the second link member presses the first link member, a relation of L3 to L4 satisfying L3>L4, where L3 denotes a distance between the first support shaft and the pressing position at which the second link member presses the first link member, and L4 denotes a distance between the first support shaft and a second pressing position at which the pressing member presses the endless belt.

2. The drive unit according to claim 1, further comprising a support that supports the first link member, wherein the first support shaft is disposed on the support.

3. The drive unit according to claim 1, wherein the first link member has an opening through which the second link member is inserted, and wherein the second link member is configured to rotate relative to the first link member to press the opening of the first link member.

4. The drive unit according to claim 1, wherein the second support shaft is disposed on the first link member.

5. The drive unit according to claim 1, further comprising a support that supports the first link member, wherein the second support shaft is disposed on the support, wherein the first link member has a shaft insertion hole through which the second support shaft is inserted, and wherein the shaft insertion hole has a clearance with the second support shaft in a rotational direction of at least the first support shaft.

6. The drive unit according to claim 1, further comprising a plurality of pressing members including the pressing member, wherein the plurality of pressing members press the endless belt at a plurality of pressing positions, and wherein L4 denotes a shortest distance among a plurality of distances between the first support shaft and the plurality of pressing positions.

7. A sheet conveyor comprising:

a conveyance member configured to convey a conveyance object; and the drive unit according to claim 1, the drive unit configured to drive the conveyance member.

8. An image forming apparatus comprising:

an image former configured to form an image on a recording medium; and the sheet conveyor according to claim 7.

9. An image forming apparatus comprising:

an image former configured to form an image on a recording medium; and the drive unit according to claim 1.

* * * * *